United States Patent

Davies et al.

[11] Patent Number: 5,615,048
[45] Date of Patent: Mar. 25, 1997

[54] IMAGING SYSTEM

[75] Inventors: Neil Davies, Snaith; Malcolm McCormick, Sheffield, both of United Kingdom

[73] Assignee: De Montfort University, Leicester, United Kingdom

[21] Appl. No.: 313,234

[22] PCT Filed: Apr. 1, 1993

[86] PCT No.: PCT/GB93/00682

§ 371 Date: Sep. 30, 1994

§ 102(e) Date: Sep. 30, 1994

[87] PCT Pub. No.: WO93/20473

PCT Pub. Date: Oct. 14, 1993

[30]  Foreign Application Priority Data

Apr. 1, 1992 [GB] United Kingdom ............... 9207140

[51] Int. Cl.⁶ ........................................ G02B 27/10
[52] U.S. Cl. ............................... 359/622; 359/619
[58] Field of Search ............................ 359/619, 620, 359/621, 622, 623

[56]  References Cited

FOREIGN PATENT DOCUMENTS

| 0084998 | 8/1983 | European Pat. Off. . |
| 0223558 | 5/1987 | European Pat. Off. . |
| 2251754 | 7/1992 | United Kingdom . |
| WO91/11745 | 8/1991 | WIPO . |

Primary Examiner—Georgia Y. Epps
Assistant Examiner—Dawn-Marie Bey
Attorney, Agent, or Firm—Wallenstein & Wagner, Ltd.

[57]  ABSTRACT

There is disclosed an imaging system forming a pseudoscopic image in focus throughout extended depth of field comprising an input relay lens array, a double integral microlens screen having a median plane on to which the input lens array images an object scene and, on the opposite side of the screen and the same distance therefrom as the input array, an output relay lens array similar to the input lens array.

4 Claims, 1 Drawing Sheet

IMAGING SYSTEM

FIELD OF THE INVENTION

This invention relates to imaging systems.

BACKGROUND OF THE INVENTION

The invention comprises an imaging system forming a pseudoscopic image in focus throughout extended depth of field comprising an input relay lens array, a double integral microlens screen having a median plane on to which the input lens array images an object scene and, on the opposite side of the screen and the same distance therefrom as the input array, an output relay lens array similar to the input lens array.

The relay lenses are substantially larger than the screen microlenses.

The double integral microlens screen may comprise a monolithic screen having back to back plano-convex lens arrays either side of the median plane each of focal length equal to half the screen thickness.

The double integral microlens screen may however comprise two similar contiguous screens each comprising double convex microlenses each having a thickness equal to the focal length.

An optical instrument comprising such an imaging system may have fixed components for dedicated use or may be adjustable, the input and output relay lens arrays being mounted for equal and opposite adjustment with respect to the double integral microlens screen.

BRIEF DESCRIPTION OF THE DRAWINGS

Embodiments of imaging systems according to the invention will now be described with reference to the accompanying drawings, in which.

DESCRIPTION OF THE PREFERRED EMBODIMENT

Figure 1:
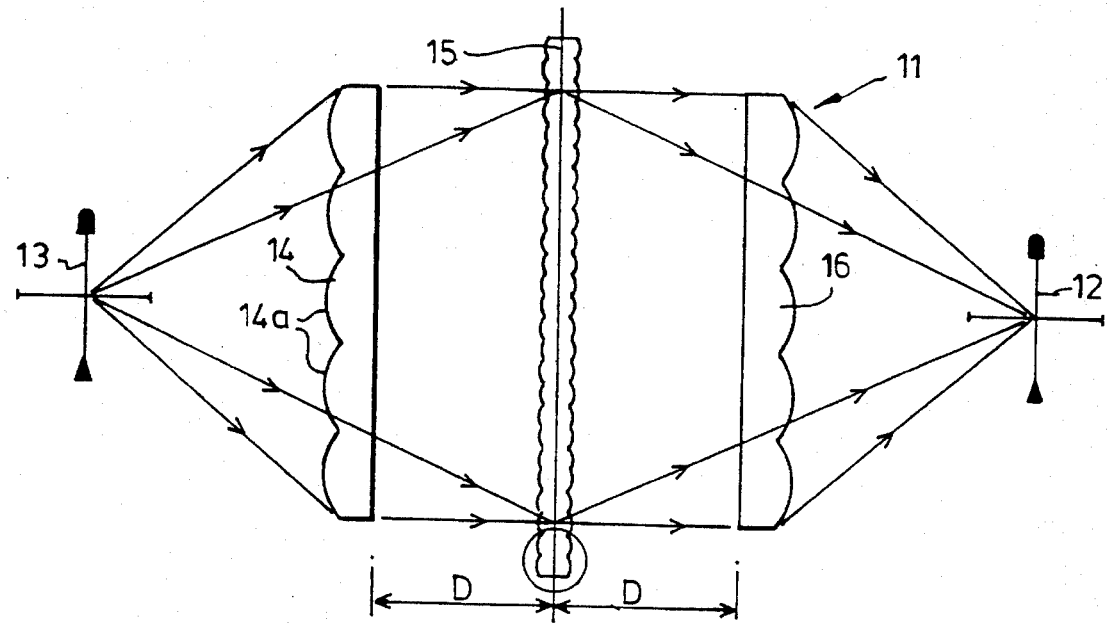
FIG. 1 is an axial section through one embodiment, showing rays and images.
Figure 1A:
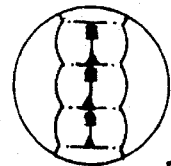
FIG. 1A is an enlargement of a circled portion at the center bottom of FIG. 1.

The drawings illustrate an imaging system 11 (FIG. 1) forming a pseudoscopic image 12 of an object 13. The image 12 is in focus throughout an extended depth of field and is in direct 1:1 correlation with the object 13. The system 11 comprises an input relay lens array 14 (see also FIG. 2 where the array is seen to be a circular array of circular lenses 14a of millimetric diameter), a double integral microlens screen 15 having a median plane on to which the input lens array 14 images the object 13 as illustrated in the scaled-up fragment in FIG. 1, and, on the opposite side of the screen 15 and at the same distance D therefrom as the input array 14, an output lens array 16 similar to the input relay lens array 14.

With millimetric dimensions, the relay lens array lenses are substantially larger than the lenslets of the microlens screen, which are of micrometric dimensions.

Figures 2, 3, 4:
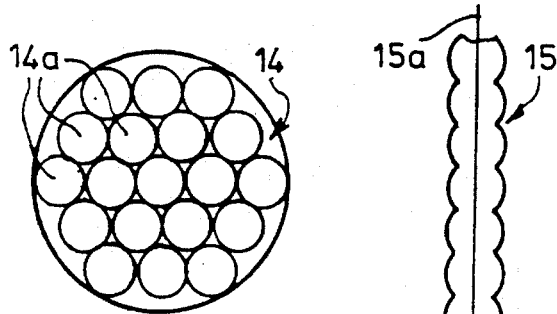
FIG. 2 is an axial view of the input relay lens array of FIG. 1.
FIG. 3 is an axial section on a larger scale of a double integral microlens screen as may be used in the embodiment of FIG. 1.
FIG. 4 is an axial section like FIG. 3 of another double integral microlens screen as may be used in the embodiment of FIG. 1.

Two forms of microlens screen 15 are shown in FIGS. 3 and 4. In FIG. 3, the screen 15 comprises a monolithic screen having back to back plano-convex microlens arrays either side of the median plane 15a. Each microlens has a focal length f equal to its thickness, i.e. equal to half the screen thickness.

The screen 15 illustrated in FIG. 4 comprises two similar contiguous screens 15b,15c each comprising double convex microlenses each having a thickness equal to its focal length f. As depicted within the box B this forms an array of micro field lens systems, which image the aperture $A_1$ on to the aperture $A_2$ on the opposite face. This reduces vignetting and cross-talk between adjacent entrance and exit lenses of the relay arrays 14,16.

The microlens array of FIG. 4 is more efficient than that of FIG. 3. In either case, as illustrated, the screens translate all impinging ray directions to transmitted ray directions which subtend the same angle to the screen. This not only images the aperture of the input relay lens on to the aperture of the output relay lens but also ensures complete angular parity between rays emanating from the input relay lenses and rays transmitted on to the output relay lenses, which ensures that object and image conjugates formed by the input lens array are exactly transmitted by the output lens array so removing any lens distortion from the transmitted 1:1 scale image and reducing chromatic and spherical aberration.

Figure 5:
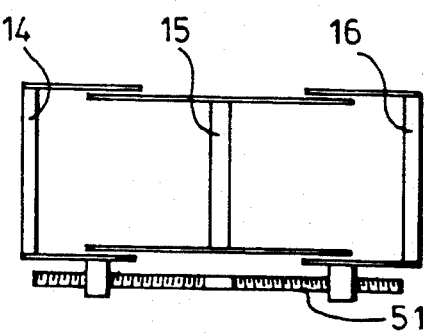
FIG. 5 is an axial section through an optical instrument embodying the imaging system of the invention.

An instrument embodying the imaging system 11 may have fixed components for example in a dedicated system where the object region is fixed, or may be adjustable so that the conjugate plane of the principal plane of interest in the object scene with respect to the input relay lens array 14 is adjustable to coincide with the median plane of the screen 15. As illustrated in FIG. 5, this can be effected by an oppositely threaded lead screw device 51.

As a recording means, the transmission screen of the invention can be used in conjunction with a photographic plate/film or other surface sensitive to the transmitted radiation which is overlaid with an array of micro spherical or micro cylindrical lenses or an opaque barrier perforated with small apertures in a uniform matrix pattern or a barrier with narrow transparent slits. When used in conjunction with the micro cylindrical lenses or transparent slits the optical transmission screen can be reduced to a single row of adjacent double lenses which increases the sharpness of the recorded image in the vertical non-parallax axis. When used as a recording means the system is capable of recording in 1:1 scale in real-time, requiring only a single exposure and in one stage directly produces a 3-D image which can be viewed in its orthoscopic form.

The focal lengths of each double array can be the same, but by appropriate choice of microlens focal length combinations, magnification in the Z direction can be controlled independently of the X and Y unit magnification.

Because of the unique arrangement of the optical elements which comprise the invention, it is capable of receiving all incoming radiation emanating from object points in the scene and to transmit these ray bundles to an equal but opposite conjugate location in true scale without lens or perspective distortion irresepective of object distance and in full natural colour. Alternatively the system can be made wavelength selective by appropriate selection of material and means.

We claim:

1. An imaging system forming a pseudoscopic image in focus throughout extended depth of field comprising an input relay lens array, a double integral microlens screen having a median plane on to which the input lens array images an object scene and, on the opposite side of the screen and the same distance therefrom as the input array, an output relay lens array similar to the input lens array, in which the double integral microlens screen comprises two similar contiguous screens each comprising double convex microlenses each having a thickness equal to its focal length.

2. The imaging system of claim 1, wherein the relay lenses are substantially larger than the screen microlenses.

3. An instrument comprising an imaging system according to claim 1, the input and output relay lens arrays being mounted for equal and opposite adjustment with respect to the double integral microlens screen.

4. An instrument comprising an imaging system according to claim 2, the input and output relay lens arrays being mounted for equal and opposite adjustment with respect to the double integral microlens screen.

* * * * *